United States Patent [19]
Holly

[11] 3,939,530
[45] *Feb. 24, 1976

[54] MOLDING APPARATUS
[75] Inventor: Harry H. Holly, Olympia Fields, Ill.
[73] Assignee: Hollymatic Corporation, Park Forest, Ill.
[ * ] Notice: The portion of the term of this patent subsequent to Mar. 11, 1992, has been disclaimed.
[22] Filed: Feb. 21, 1974
[21] Appl. No.: 444,299

[52] U.S. Cl. .................................................. 17/32
[51] Int. Cl.² ........................................ A22C 7/00
[58] Field of Search .................. 17/32; 44/11, 13; 425/DIG. 812

[56] References Cited
UNITED STATES PATENTS

| | | | |
|---|---|---|---|
| 2,643,620 | 6/1953 | Miller | 425/812 |
| 2,814,921 | 12/1957 | Beerend | 17/32 |
| 3,386,129 | 6/1968 | Holly | 17/32 |
| 3,486,186 | 12/1969 | Richards et al. | 17/32 |
| 3,869,757 | 3/1975 | Holly | 17/32 |

Primary Examiner—Louis G. Mancene
Assistant Examiner—James D. Hamilton
Attorney, Agent, or Firm—Wegner, Stellman, McCord, Wiles & Wood

[57] ABSTRACT

An apparatus for shaping successive molded articles from moldable material such as flat food patties from ground beef, ground fish and other moldable food materials. The apparatus has a mold opening in a movable mold for receiving a pressurized charge of the moldable material, an entrance to the mold, a vent from the mold opening spaced from the mold entrance for venting air displaced by the pressurized charge entering the mold opening, and a rigid valve between the mold entrance and vent movable into engagement with a valve seat before the pressurized charge reaches the vent to close the vent when the valve member is displaced by the advancing pressurized charge. The result is that the air and any other gases present are expelled from the mold opening automatically by the pressure of the entering charge and the vent is then automatically closed to prevent any substantial loss of the material through the vent. Then the moving of the mold as to an ejecting position automatically reopens the valve.

The disclosure also includes a combined mold and valved air vent means for use in an apparatus for pressure shaping articles from a moldable patty material in which the combination includes a mold plate having opposite surfaces and a mold opening extending through the plate with one of the surfaces comprising a defining surface for one side of an air vent directing air from the opening under the pressure of an entering pressurized charge of moldable material, a rigid valve within the opening at the peripheral edge thereof with the valve being mounted for movement relative to this edge to vent closing position when the valve is subjected to the pressurized entering material and a retainer for retaining the valve in the mold in a normally open vent position when the mold opening is substantially empty.

21 Claims, 10 Drawing Figures

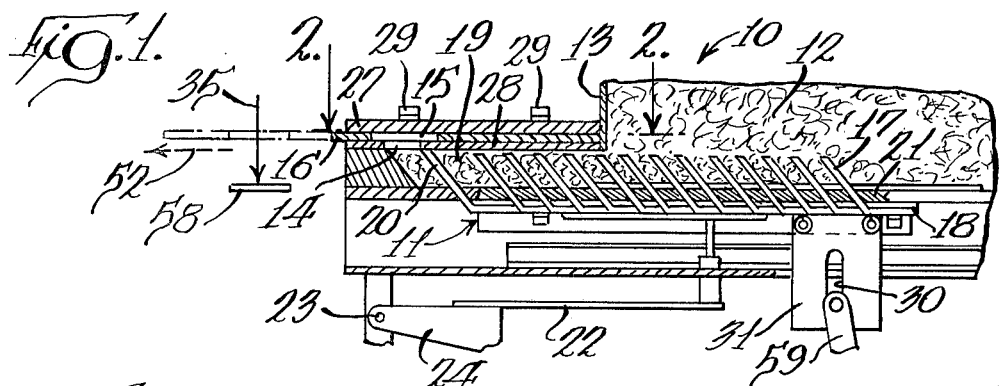
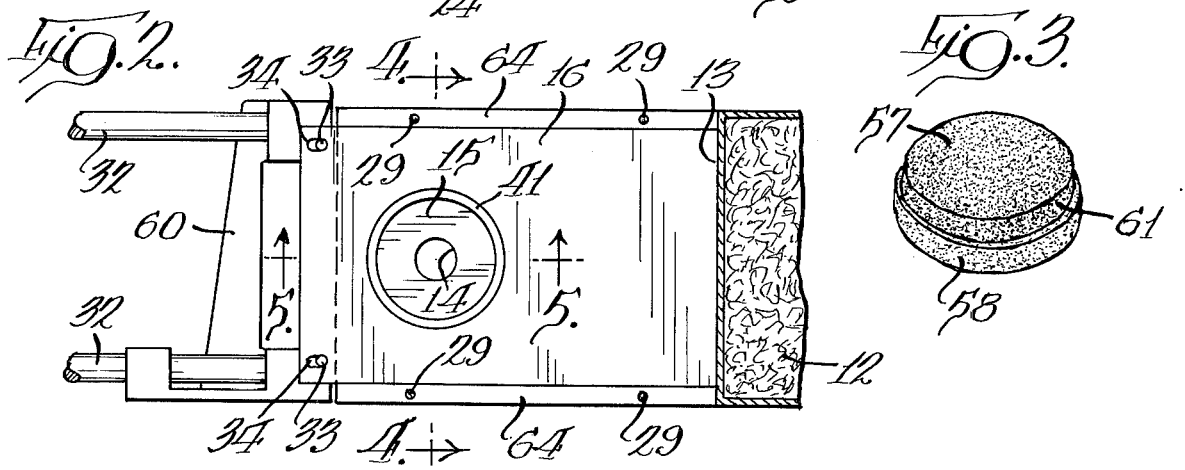
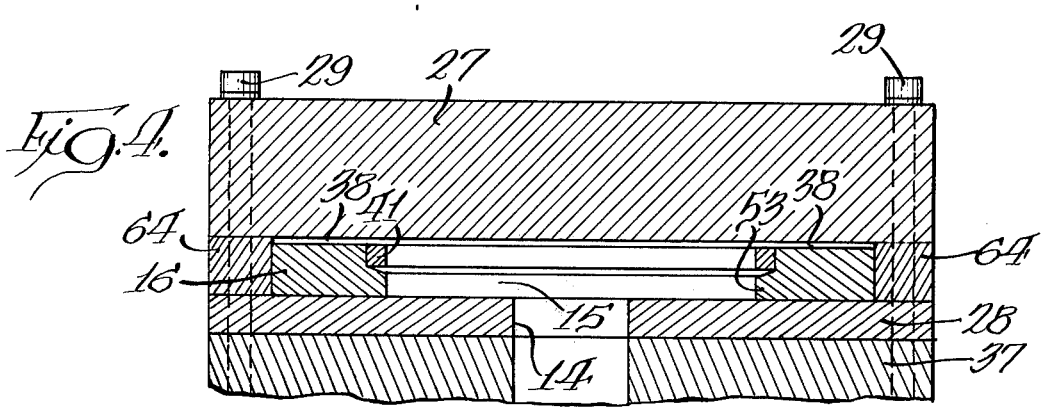
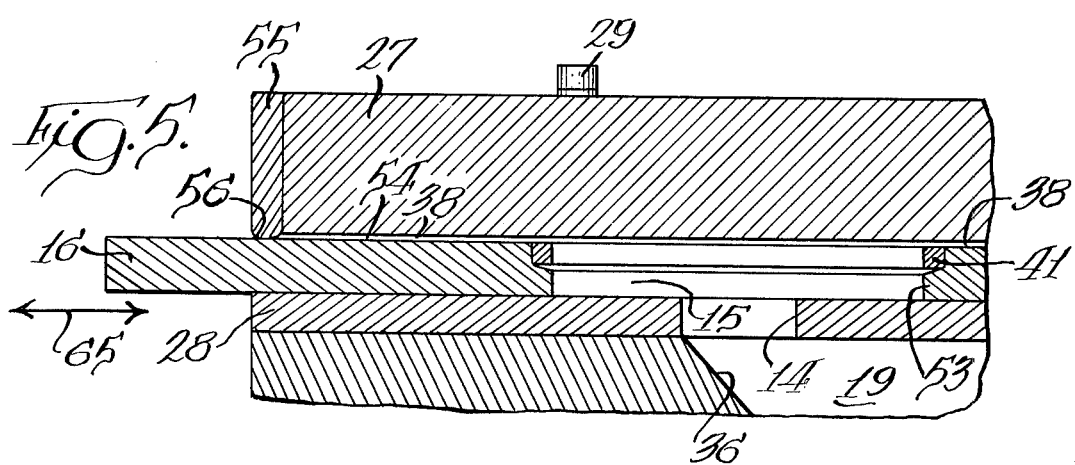

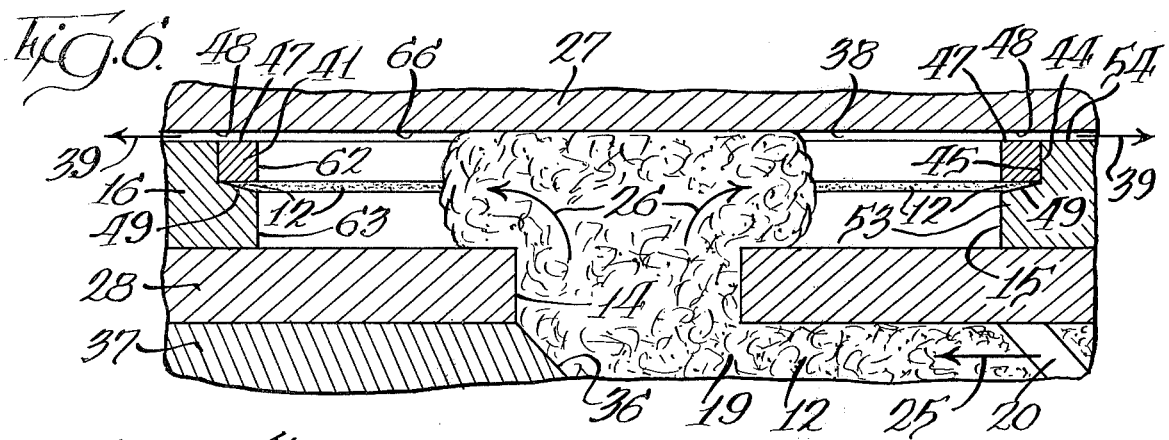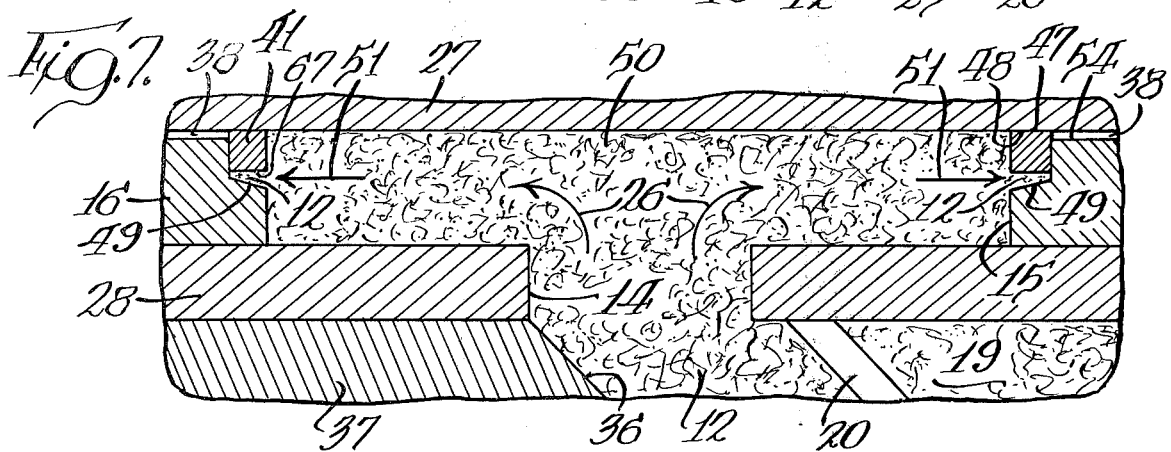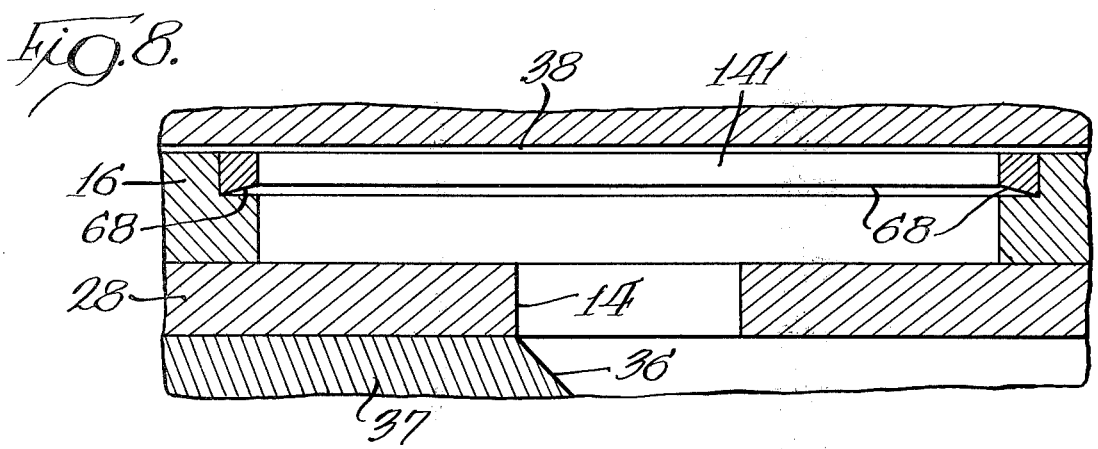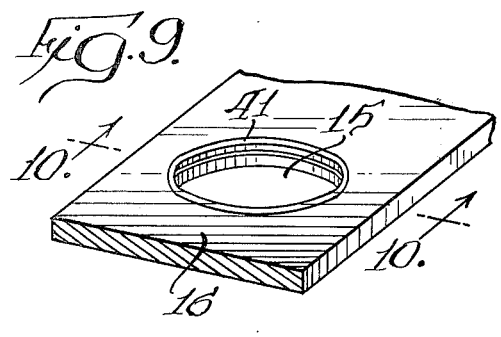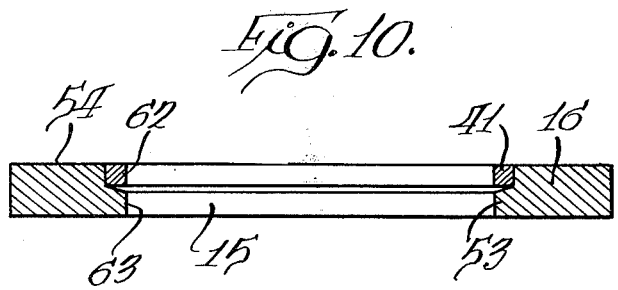

MOLDING APPARATUS

BACKGROUND OF THE INVENTION

This invention relates to the art of pressure molding moldable material to form a shaped article and specifically relates to pressure molding a patty of a moldable food material such as ground raw beef and other shapable and plastic food materials by compressing the moldable material into a mold opening of a movable mold to give it a desired shape.

The invention particularly pertains to an automatically operable valved vent structure in which air and such fluids as are within the mold opening are ejected from the opening by the pressure of the advancing pressurized charge of material and with a rigid valve member such as a metal valve member being automatically moved to vent closing position when the mold opening is filled with the moldable material. This movement of the valve member is caused by the pressure of the advancing pressurized material. The valve is automatically returned to open position when the mold is moved to a second position such as one in which the molded article is removed.

SUMMARY OF THE INVENTION

In the pressure molding and shaping of plastic material by directing a pressurized charge of material into a mold opening the entrapped air not only requires great pressure to fill the opening but also results frequently in misshapen articles because the entrapped air prevents the article from being shaped smoothly and uniformly.

These problems are particularly acute in molding food articles such as food patties from ground beef, ground fish and the like. The reasons include the fact that in order to fill a mold opening such as a patty shaped opening in a reciprocable mold plate (as illustrated in the prior patty machine patents assigned to the same assignee as the present application) the pressure required to overcome the resistance of the trapped air is so great that the food material, and particularly the ground raw beef in forming hamburger patties, is excessively compressed which tends to expel juices, make the meat tough by excessive "working" and produces a patty that when cooked has a solid texture and a flavor that are inferior to a hand shaped patty such as are made and cooked at home.

The above difficulties are avoided with the structure of this invention wherein the air and any other gases present in the mold opening are automatically expelled through a vent provided for this purpose by the incoming charge of pressurized material and then automatically closed before any substantial loss of this material.

Among the advantages achieved by this invention are the following: The meat is kept loose and "fluffy" as it is not toughened nor are juices expelled by excessive pressure and "working" because with this invention the only pressure required is that necessary to force the material into the mold opening. Very little power is required by the presence in the mold opening of air as it is vented through a relatively free vent. Furthermore, the power requirements of a molding apparatus embodying the invention are greatly reduced because it is now not necessary to exert the great pressures previously required on the material and particularly plastic food material in order to fill the mold opening completely with the material and at the same time expel the entrapped air.

By venting air from the mold opening the resulting patties, for example, are formed precisely to the shape of the mold. Also, because there is no excess of trapped air the patty does not fall apart neither in the raw state nor especially during and after cooking. Likewise, the absence of excess trapped air permits a round patty to maintain this shape during cooking.

Hamburger patties produced with the apparatus of this invention have the appearance, texture and the "eating" qualities after cooking of a high grade hand produced patty where the meat is customarily formed in a mass and then flattened on the cooking surface with a hand spatula. Thus the patty when formed in the apparatus of this invention has a superior appearance as it is uniform throughout because of the absence of excessive amounts of trapped air and the avoidance of excessive pressure on the moldable material. The patties also have a uniform size and shape where successive patties are produced in the same mold opening. The cooked patty has a "fluffy" texture and "bitability" similar to the hand made patties. In fact, the differences when eating a cooked patty made in the apparatus embodying this invention are so remarkable that the meat from which the patties are made appears to be of higher grade and quality than are the patties made from exactly the same meat but using the required high pressure of the prior art.

BRIEF DESCRIPTION OF THE DRAWINGS

FIG. 1 is a fragmentary vertical sectional view of a molding device as disclosed and claimed in my prior U.S. Pat. No. 3,293,688 and showing the feeder means at the completion of its movement toward the mold opening and after the mold opening has been filled.

FIG. 2 is a fragmentary sectional view taken substantially along line 2—2 of FIG. 1.

FIG. 3 is a perspective view of a cooked patty superimposed on an uncooked patty to illustrate the slight shrinkage during cooking and the maintenance of a perfectly round configuration.

FIG. 4 is an enlarged transverse sectional view taken substantially along line 4—4 of FIG. 2.

FIG. 5 is an enlarged fragmentary longitudinal view taken substantially along line 5—5 of FIG. 2.

FIG. 6 is an enlarged fragmentary vertical sectional view illustrating the filling of the mold opening with the pressurized charge of plastic material.

FIG. 7 is a view similar to FIG. 6 but illustrating the positions of the parts when the mold opening is completely filled and the valve member closed.

FIG. 8 is a view similar to FIG. 6 but illustrating a second embodiment of the valve.

FIG. 9 is a fragmentary perspective view of the mold plate and valve only of the first embodiment.

FIG. 10 is a transverse sectional view taken substantially along the line 10—10 of FIG. 9.

DESCRIPTION OF THE PREFERRED EMBODIMENTS

In my above prior patent which is assigned to the same assignee as the present application the patty forming apparatus, but without this invention, of course, is disclosed in detail and claimed. For the purposes of this application only those parts necessary to illustrate the invention are shown.

Thus the mold apparatus 10 comprises a feeder 11 to force the plastic material such as the ground meat 12 from a supply means such as a hopper 13 through an exit from the supply means 13 which also serves as an entrance 14 to the mold cavity or opening 15 which in the embodiment illustrated is a circular opening in a reciprocable flat mold plate 16.

Although in the illustrated embodiment there is disclosed only a single mold opening 15 the invention is equally applicable to multiple opening devices for molding and shaping a plurality of articles at the same time such as disclosed by the apparatus in U.S. Pat. No. 3,765,056 also assigned to the same assignee.

The feeder means 11, as explained in detail in the first above patent, is essentially a four motion feeder that comprises forwardly sloped spaced pins 17 mounted on a bottom plate 18 and sloped forwardly toward the front of a supply passage 19 that is at the bottom of the hopper 13. At the front of the plate 18 on which the pins 17 are mounted there is provided a forwardly sloped feeder bar 20 that extends substantially completely across the generally horizontally rectangular passage 19.

In the first of the four motions the feeder means 11 is lowered from the position shown in FIG. 1 to beneath the hopper 13 but with the upper ends of the pins 17 retained in the horizontally reciprocable pin plate 21. This lowering is accomplished by dropping the lever 22 about its fulcrum 23 by engagement with a cam (not shown) operating on a cam follower 24. Then in the second motion the feeder means 11 is retracted to the right as viewed in FIG. 1 with the lowered pins 17 and feeder bar 20 still in engagement with the plate 21. In the third motion the feeder means 11 is raised substantially vertically to re-introduce the feeder bar 20 and pins 17 into the bottom of the hopper to substantially the same position as shown in FIG. 1 but of course rearwardly or to the right of that shown.

Then, the fourth motion moves the pins 17 and feeder means 11 forwardly horizontally to the position shown in FIG. 1 to keep the passage 19 filled and to apply pressure to the plastic material 15 in front of the bar 20 so that the resulting pressurized material which is moving in the direction indicated by the arrow 25 (FIG. 6) forces the material up through the entrance or fill opening 14 and radially outwardly as indicated in FIGS. 6 and 7 by the arrows 26. This forward motion as well as the opposite rearward motion is accomplished by means of a reciprocable hinged lever 59 engaging a vertical slot 30 in a downward extending bracket 31 that is attached to the bottom of the feeder plate 18, all as explained in the first above patent.

The mold plate 16 is reciprocated horizontally between top 27 and bottom 28 plates that are held in this relationship by spaced bolts 29 that also pass through side parallel spacer bars 64 between which the mold plate 16 is reciprocated in the usual way as indicated by the arrow 65 (FIG. 5). As is true with apparatus of this type and as is explained fully in the first above patent the horizontal reciprocation of the mold plate 16 is in timed relationship to the movement of the feeder 11 so that the feeder moves forwardly or to the left as shown in FIG. 1 to coincide with the time the mold opening 15 is in communication with the fill opening 14 as shown in FIGS. 6 and 7.

In the illustrated apparatus the fill opening 14 is circular and substantially concentric to the similarly circular mold opening 15 during filling thereof. This concentric arrangement is preferred whether the resulting patties are circular or chop shaped or any other desired configuration. However, it is only necessary that the fill opening 14 have a portion spaced inwardly of the outer periphery of the mold opening 15.

The mold plate 16 as is explained in the first above patent is driven in its horizontal reciprocation by mold moving means comprising a slidable member 60 moved back and forth on parallel rods 32. This slidable member 60 carries upwardly projecting side pins 33 each of which engages an elongated slot 34 for movement of the mold plate forwardly to the patty knockout position illustrated by the broken lines to the left of FIG. 1 where the patty is removed in the customary manner as indicated by the vertical arrow 35.

The forward end of the fill passage 19 is defined by an upwardly sloped surface 36 on a spacer block 37 that is immediately beneath the bottom plate 28. The compressing of the moldable material 12 between the approaching 25 feeder bar 20 and the sloped surface 36 pressurizes the plastic material 12 to force it into the mold opening 15 in the manner previously described.

In order to vent entrapped gases and particularly air that are in the mold opening 15 there is provided a clearance vent 38 between the mold plate 16 which in the illustrated embodiment is at the top 54 thereof and the bottom 66 of the top plate 27. This vent extends horizontally from the mold opening so that the entering pressurized material illustrated by the arrows 26 in FIG. 6 forces the air out ahead of it as illustrated by the arrows 39. The spacing that maintains the vent 38 is provided by the above described spacer bars 64 (FIG. 4). This vent 38 in an apparatus for molding flat patties of ground raw beef may be of the order of 0.020 inch. The important fact is that the air being of very low viscosity escapes rapidly through the vent passage 38 but the material 12 has a much greater resistance to flow through the narrow passage 38.

In order to close the air vent passage 38 when the air has all been forced out and thereby prevent escape of any material amounts of the plastic material itself there is provided a pressure responsive rigid valve member 41 in an annular recess surrounding the mold opening 15. This valve member 41 has a cylindrical outer surface 44 that is slidably retained against a similar surface 45 in the mold plate 16. This mold plate surface 45 is inwardly stepped by a flange 53 in the mold plate so as to provide a stop to limit downward sliding movement of the valve member 41 during its movement between vent open (FIG. 6) and vent closed (FIG. 7) positions. The inner circumference 62 of the valve ring 41 is substantially aligned with the inner circumference 63 of the mold opening so that the combination of these determine the outer circumferential shape of the resulting patty 58.

Thus the rigid valve member 41 moves into vent closing position by engagement of the valve by the advancing charge 26 of pressurized material that is forced ahead of the advancing feeder bar 20. The top 47 of the valve member 41 therefore functions as a rigid valve sealing surface operating against a rigid valve seat 48 which is the annular area of the plate 27 immediately above the top 47 of the valve member. There is thus a rigid surface to rigid surface seal or, in the illustrated embodiment, a metal-to-metal seal of the air vent passage 38. In order to aid the pressure reaction upward or vent closing movement of the rigid valve member 41 there are provided pressure reactive means which in the embodiment of FIGS. 6 and 7 is the flat bottom 67 of the ring exposed to the advancing material 26 by an outward and upward bevel 49 on the top of the supporting flange 53. In the illustrated embodiment this bevel is about 14° from the horizontal. In the embodiment of FIG. 8 this bevel is on the bottom 68 of the valve ring valve member 141 to provide the pressure reactive means.

In a patty molding apparatus, particularly for molding hamburger patties, the height of the vent 38 is preferably about 0.012 to 0.027 inch with one embodiment using a height of 0.020 inch. When the mold opening 15 is filled as indicated at 50 in FIG. 7 to form the patty 58 the pressure of the plastic material such as the food patty material enters beneath the valve 41 or 141 as indicated by the arrows 51 and forces the valve member 41 upwardly to engage the rigid surfaces 47 and 48 and close the vent passage 38. This action occurs immediately between the time the mold opening 15 is filled to produce the patty and the time the air in the mold opening has substantially all escaped through the vent 38. The completeness of this venting of air is indicated by the fact that very little if any meat or juices escape past these contacting seal surfaces 47 and 48.

As is customary in machines of this type as soon as the mold opening 15 is filled the mold plate 16 is moved as indicated by the arrow 52 (FIG. 1) toward external ejecting position for the patty as indicated by the arrow 35. This movement as well as the reverse movement back to the opening charging position, both indicated at 65 in FIG. 5, is used to return the rigid valve member 41 to its initial position preparatory to again charging the mold opening with material. This normal position in the illustrated embodiments is the lowermost position against the flanged stop 53 where the top seal surface 47 of the valve 41 is essentially flush with the top surface 54 of the mold plate 16. In order to provide this positive return there is provided a cam 55 engaging the mold plate top surface 54 with this cam being embodied in a member across the front of the pressure plate 27 for the full width of this plate 27 and having a downwardly extending arcuate cam surface 56. This surface being arcuate on both sides of its vertical center line engages and presses downwardly the valve member 41 when the filled mold (FIG. 7) is moved outwardly to ejecting position 35 and the empty mold moved back to filling position (FIG. 6).

When the mold opening 15 is in its normal filling position the fill opening 14 which is preferably generally circular has at least a portion within the confines of the valve member 41 as illustrated. In a preferred embodiment the fill opening 14, the mold opening 15 and the valve member 41 are all substantially concentric during filling (FIG. 6).

In the illustrated embodiment the mold opening 15 is of generally flat configuration and has a peripheral edge at which is located the vent and the valve member. In the illustrated embodiment the vent and valve member are substantially coextensive with the periphery of the mold opening 15.

If desired the valve member 41 which is here shown as a continuous ring may be horizontally split to form two rings with each having facing beveled surfaces similar to the surfaces 68 and the two moving vertically apart to close the vent 38 at the top of the mold plate 16 and a similar vent at the bottom of the mold plate. Similarly, the valve member need not be a complete ring enclosing the mold opening 15 but may be any rigid, movably mounted member capable of closing an air escape vent passage from the mold opening after the air has been forced out.

In one embodiment of the invention in the hamburger patty molding machine the air vent, as stated above, was 0.020 inch high. When the valve surfaces 47 and 48 were in vent closing substantial contact with each other the spacing between the surfaces 47 and 48 is only about 0.007 inch maximum. When the valve was closed there was substantially no leakage of either juice or tiny particles of meat past the closed valve into the vent area 38.

As is shown in the accompanying FIG. 3 (which is an exact reproduction of the patties themselves) a cooked patty 57 superimposed on an uncooked patty 58, both made of the same ground beef and at the same time on the same patty machine, is only slightly smaller after complete cooking than the raw patty 58. Furthermore, as is shown in this figure the peripheral edge 61 of the cooked patty is smooth and free of visible cracks and the cooked patty maintains practically perfectly its circular shape rather than shrinking out of round to an oval or other distorted shape as is common in this art.

In a companion patent application of the same inventor assigned to the same assignee Ser. No. 436,192, filed Jan. 24, 1974 now U.S. Pat. No. 3,869,757, issued Mar. 11, 1975 a flexible valve member such as a rubber ring is disclosed and claimed. This flexible type of valve is functionally useful to vent air from the mold opening and then close the vent passage but the rigid valve and the rigid valve closing surface contact of this invention is preferred. In some instances where a flexible valve is used it has been found that in high speed production the air is forced past the flexible valve at such a high rate that the air tends to have a venturi effect and draw or suck the flexible valve to close or partially close the vent passage.

Furthermore, this effect on a flexible valve member is different for different size patties and thus different volume mold openings so that for the best operation it would be necessary to change the flexible valve hardness characteristics for each size of patty. Also, the fast moving escaping air acting on the flexible valve member tends to cause changes in dimensions of the periphery of the mold opening and variations in patty shape as well as patty density. Because with a flexible valve there is always some air leakage at high speed production, there is a tendency to produce patties of irregular shape and some even have cracks at their outer edges. Although these are conditions that can be corrected with the flexible valve member and therefore this type of valve member is useful and workable, it has been found that this invention with a rigid valve seating against a rigid surface is superior.

The operation of the machine embodying the invention is as follows. With the parts in the positions shown in FIG. 6 the advancing feeder bar 20 pushes the plastic material 12 in front of it and forces it up through the fill opening or entrance 14 and then radially outwardly as indicated at 26 to fill the mold opening 15 which is defined on its sides by a combination of vertically aligned surfaces 62 and 63.

Once the advancing feeder bar 20 has filled the mold opening 15 in the manner illustrated in FIG. 7 the pressurized charge of plastic material operating against the bottom of the valve member 41 as indicated by the arrows 51 lifts the valve member 41 upwardly to seat the rigid surfaces 47 and 48 in contact with each other and seal the air vent 38 as by this time the advancing charge 26 of plastic material has forced the air 39 from the interior of the mold opening 15.

Then, as is customary with a patty machine of this type, the mold plate 16 is moved to the patty ejecting position as indicated by the broken lines in FIG. 1 where the patty is removed as indicated at 35 and in the meantime the feeder 11 is retracted to the right of the position shown in FIG. 1 preparatory to shaping the next patty.

This movement of the mold plate 16 to the patty removal position takes place with the valve member 41 in raised position. However, as the raised valve member 41 passes beneath the arcuate cam surface 56 in both moving toward the ejecting position and back again to filling position the valve member 41 is pressed back into its normal position shown in FIG. 6 where the air vent 38 is open. Upon being returned to its initial position the empty mold opening 15 is then ready for the next charge of plastic material and the forming of the next successive patty.

The second embodiment of the invention illustrated in FIG. 8 operates in exactly the same way except here instead of the cross section of the valve ring being a square and with the bevel a part of the flange 53 the flange is square and the ring bottom is beveled as shown at 68.

Having described my invention as related to the embodiments shown in the accompanying drawings, it is my intention that the invention be not limited by any of the details of description, unless otherwise specified, but rather be construed broadly within its spirit and scope as set out in the appended claims.

I claim:

1. Apparatus for shaping an article from moldable material, comprising: a movable mold having a mold opening for receiving a pressurized charge of said material for said shaping of said article, the mold being movable between mold opening filling and article discharge positions; an entrance means to said mold opening at said filling position; means for directing said pressurized charge through said entrance means at said filling position and into said mold opening for said shaping of said article; vent means spaced from said mold entrance means for venting from said mold opening air displaced by said pressurized charge entering said mold opening; a valve seat adjacent to said vent means; a movable rigid valve member spaced from said seat but movable into seat engaging position for closing said vent means; means for moving said valve means to said seat engaging position and thereby closing said vent means by said pressurized charge; means for moving said mold relative to said entrance to said discharge position; and means for thereafter bodily moving said valve member to air venting position.

2. The apparatus of claim 1 wherein said mold opening has a periphery at which is located said valve member.

3. The apparatus of claim 2 wherein said vent means and valve member are substantially coextensive with said periphery.

4. The apparatus of claim 1 wherein said valve member is provided with pressure reactive means thereon for urging the valve member toward closed position when said pressure reactive means is engaged by said entering pressurized charge.

5. The apparatus of claim 4 wherein said pressure reactive means comprises a surface portion on said valve member on a side thereof opposite to said valve seat.

6. The apparatus of claim 5 wherein said valve member is annular and said surface portion comprises a bottom surface of said valve member.

7. The apparatus of claim 2 wherein said entrance means has a portion within said periphery of said mold opening and inwardly of said valve member.

8. The apparatus of claim 7 wherein said mold opening entrance is substantially centrally located with respect to said periphery.

9. The apparatus of claim 1 wherein said mold opening is provided in a reciprocable mold plate and there are provided cam means for engaging and thereby returning said valve member to its normally open position.

10. The apparatus of claim 9 wherein said apparatus comprises opposite guide members between which said mold plate is movable and with one of the guide members having mounted thereon said cam means.

11. The apparatus of claim 10 wherein said guide members are vertically spaced with said mold plate positioned therebetween and said cam means is located on the upper guide member.

12. Apparatus for shaping an article from moldable material, comprising: a movable mold having a mold opening for receiving a pressurized charge of said material in shaping said article and movable beteween mold opening filling and article discharge positions; an entrance means to said mold opening at said filling position; vent means defining a vent spaced from said mold entrance means for venting air from said mold opening displaced by said pressurized charge entering said mold opening; a valve for opening and closing said vent comprising a rigid surface valve seat and a movable mounted rigid valve member spaced from said seat but movable into seat engaging position for substantially closing said vent in a rigid surface to rigid surface contact and movable away from said seat for opening said vent; valve closing means in communication with said mold opening and activated by said pressurized charge in said mold opening for moving said valve member to vent closing position when said opening is substantially filled with said pressurized charge; and valve opening means spaced from said entrance means activated by said movement of the mold for moving the valve member to vent opening position.

13. The apparatus of claim 12 wherein said mold opening has a periphery at which is located said valve member and said vent means and valve member are substantially coextensive with said periphery.

14. The apparatus of claim 12 wherein said valve member is provided with pressure reactive means thereon for urging said valve member toward closed position when said pressure reactive means is engaged by said entering pressurized charge, said pressure reactive means comprising a surface portion on said valve member on a side thereof opposite to said valve seat.

15. The apparatus of claim 12 wherein said entrance means has a portion within said periphery of said mold opening and inwardly of said valve member.

16. The apparatus of claim 12 wherein said mold opening entrance is substantially centrally located with respect to said periphery.

17. For use in an apparatus for pressure shaping articles from a moldable material, a combined mold and valved air vent means, comprising: a mold plate having opposite plate surface means and a mold opening extending through the plate, one of said surface means comprising an air vent for directing air from said opening under the pressure of an entering pressurized charge of said material, said opening being defined by a peripheral edge surface; a rigid valve within said opening at said edge surface; means mounting said valve for movement relative to said edge to vent closing position when said valve is subjected to said entering material; and means on said plate for retaining said valve in normally open vent position when said mold opening is substantially empty.

18. The mold and valved air vent of claim 17 wherein said vent means and valve member are substantially coextensive with the periphery of said mold opening.

19. The mold and valved air vent of claim 17 wherein said valve member is provided with pressure reactive means thereon for biasing the valve member toward closed position when said pressure reactive means is engaged by said entering pressurized charge.

20. The mold and valved air vent of claim 19 wherein said pressure reactive means comprises a continuous surface means on said valve member.

21. The mold and valved air vent of claim 17 wherein said valve comprises a continuous rigid member extending around and against said peripheral edge and located within the confines of said opposite surfaces when said mold opening is substantially empty and said vent is correspondingly open.

* * * * *